Figure 1:
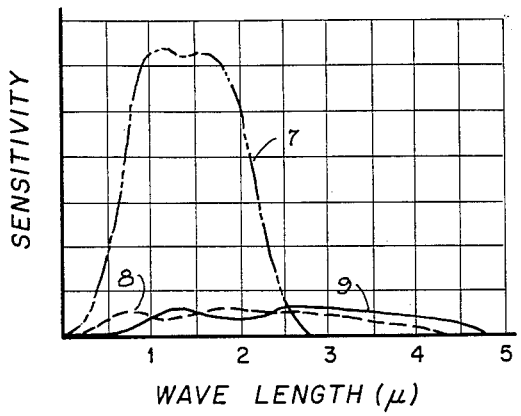

April 17, 1956     J. R. JENNESS, JR     2,742,550
DUAL PHOTOCONDUCTIVE INFRARED DETECTOR Filed April 19, 1954     2 Sheets-Sheet 1

INVENTOR.
JAMES R. JENNESS JR.
BY
ATTORNEYS

April 17, 1956  J. R. JENNESS, JR  2,742,550
DUAL PHOTOCONDUCTIVE INFRARED DETECTOR
Filed April 19, 1954  2 Sheets-Sheet 2

INVENTOR.
James R. Jenness Jr.
BY
K. F. Ross
ATTORNEYS

2,742,550
Patented Apr. 17, 1956

2,742,550
DUAL PHOTOCONDUCTIVE INFRARED DETECTOR

James R. Jenness, Jr., Southampton, Pa.

Application April 19, 1954, Serial No. 424,287

32 Claims. (Cl. 201—63)

(Granted under Title 35, U. S. Code (1952), sec. 266)

The invention described herein may be manufactured and used by or for the Government of the United States of America for governmental purposes without the payment of any rolayties thereon or therefor.

This invention relates to a detector cell for infrared radiation, more particularly, it relates to a photoconductive infrared detection cell utilizing at least two photoconductive materials, and the process for its manufacture.

In the use of infrared detection cells of the photoconductive type it is highly important that as much signal energy as possible be collected and effectively used by the detector for the production of electrical energy. Various expedients have been used to increase the sensitivity of detection cells to weak signals. For example, a reflecting surface adapted to reflect unused radiation back through the photoconductive layer has been used. Another expedient is the use of a reflection reducing coating on the surface of the photoconductive layer to minimize reflection of incident radiation, as disclosed in my co-pending application Serial No. 424,288, filed in the U. S. Patent Office April 19, 1954.

A serious limitation of prior art infrared detection cells to the detection of weak signals results from the limited wave length sensitivity of the photoconductive materials themselves. For example, lead sulfide, one of the better photoconductive materials, has good sensitivity for infrared radiation of wave length shorter than about 3.5 microns but has very little sensitivity for infrared radiation of wave lengths longer than this, so that especially in the case of radiation of low intensity it is highly desirable to have available detection means sensitive to radiation of longer wave lengths.

It is, therefore, an object of this invention to provide an infrared detection cell of increased efficiency over prior art cells.

It is another object of this invention to provide a photosensitive infrared detection cell which is sensitive to a relatively wide wave length band.

It is a further object of this invention to provide an infrared detection cell in which reflection of incident radiation is reduced to a minimum.

It has been found that the above and other objects are accomplished by increasing the spectral range of sensitivity of infrared detection cells through incorporation therein of photoconductive materials of different wave length sensitivity ranges. In the preferred modification of the invention, a base transparent to infrared radiation is coated on one side with a reflecting surface adapted to reflect unused radiation through the base back into the photoconductive material and on the other side with a coating of photoconductive material of a well defined sensitivity range. A coating of transparent dielectric material on the photoconductive coating separates it from a coating of a second photoconductive material of a different wave length sensitivity range. Preferably lead sulfide, having a sensitivity range up to 3.5 microns is used as one photoconductive coating and either lead selenide or lead teluride with sensitivity ranges up to about 5 microns as the other coating. The overall efficiency of the cell is increased by placing a reflection reducing coating over the second photoconductive coating to minimize the reflection of incident radiation.

Figure 3:
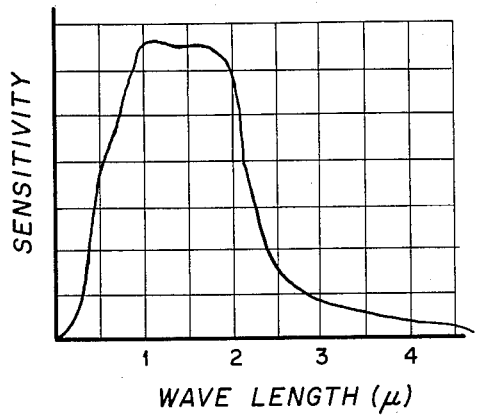
Figure 2:
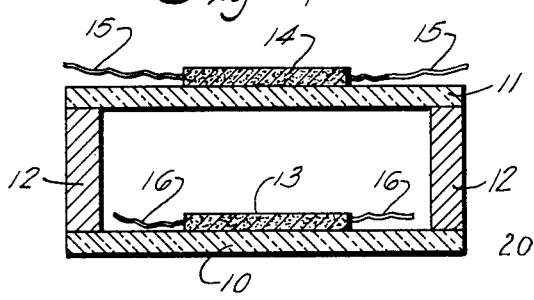
Figure 4:
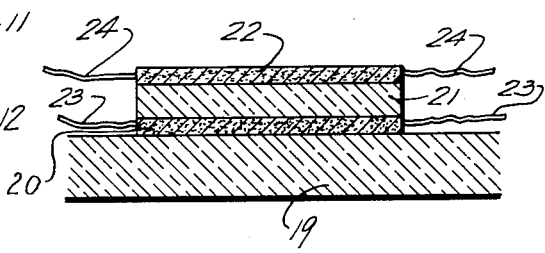
Figure 5:
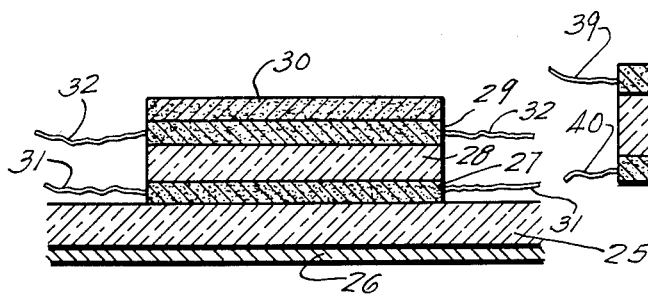
Figure 6:
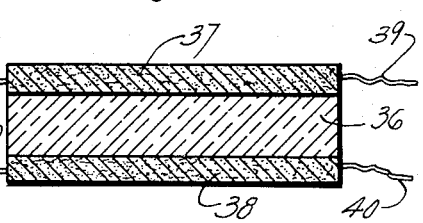
Figure 7:
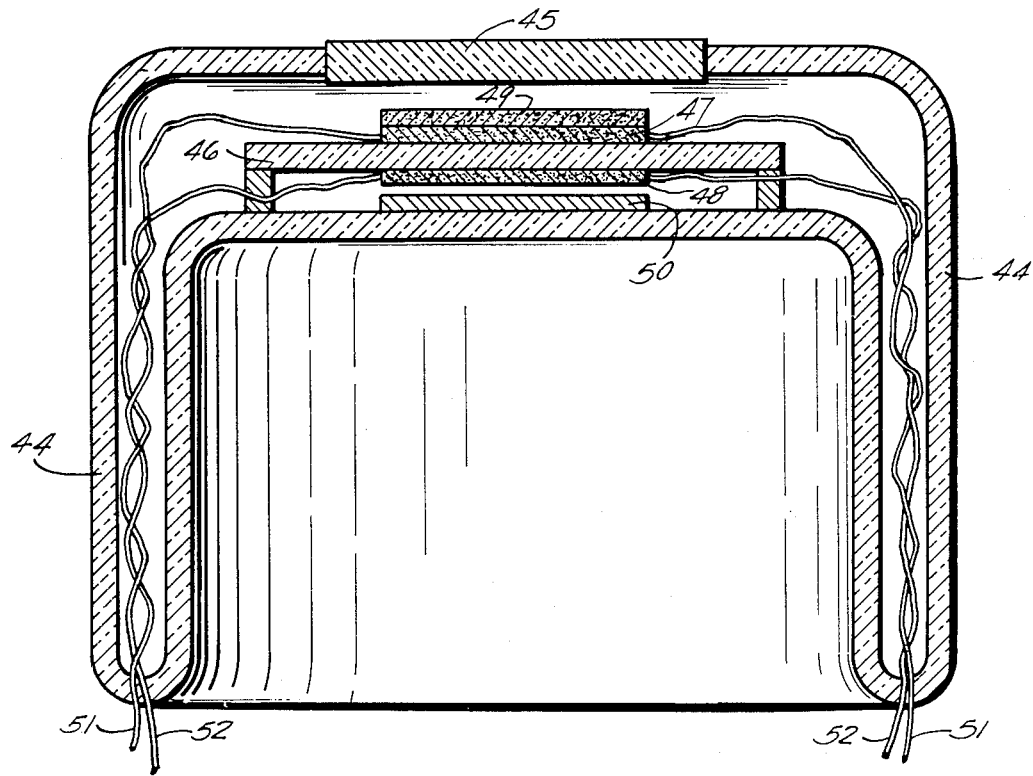

The invention is best understood by reference to the accompanying drawings hereby made a part of this application and in which Fig. 1 is an illustrative graph in which wave length is plotted against sensitivity to infrared radiation for lead sulfide, lead teluride and lead selenide, Fig. 2 is a vertical cross section of one modification of the invention, Fig. 3 is an illustrative graph in which wave length is plotted against infrared sensitivity for a combination of photoconductive materials used in the cell of the invention, Fig. 4 is a vertical cross sectional view of a second modification of the invention, Fig. 5 is a vertical cross sectional view of a third modification of the invention, Fig. 6 is a vertical cross sectional view of a fourth modification of the invention and, Fig. 7 is a vertical cross section of a fifth modification of the invention.

In the graph of Fig. 1 spectral sensitivity is plotted on the ordinate against wave length on the abscissa for three of the most common photosensitive materials. The sensitivities in arbitrary units of lead sulfide, lead teluride and lead selenide are represented by the broken lines 7 and 8 and the solid line 9 respectively. The areas beneath the lines furnish a comparative showing of the potential of the various photoconductive materials for converting infrared radiation to electrical energy. It is readily seen that any arrangement of two or more photoconductive materials in a detection cell which would result in an increased area of combined sensitivity would be highly desirable.

In the detection cell of Fig. 2, the numeral 10 represents a base which in this modification need not be transparent to infrared radiation but must be of dielectric material. The numeral 11 indicates the top of the cell and is of material such as sapphire, calcium fluoride or magnesium oxide which is a dielectric and is transparent to infrared radiation. The sides of the cell are indicated at 12. A coating 13 of photoconductive material such as lead sulphide having sensitivity for wave lengths of infrared radiation up to about 3.5 microns is applied to the upper surface of base 10. A coating 14 of a second photosensitive material of different wave length sensitivity range such as lead selenide or lead teluride, each of which has a spectral sensitivity range for infrared radiation up to about 5 microns, is applied to the upper surface of the top 11 of the cell. The coatings are approximately from one to two microns in thickness and are applied by vacuum evaporation. Other means of application may be used when suitable, such as, spraying, chemical deposition or others. For conducting electrical energy to an indicating device, electrical leads 15 and 16 are provided for coatings 14 and 13 respectively.

In operation the photoconductive surface 14 is exposed to incident infrared radiation. If the photoconductive coating is lead selenide, for example, the electrical energy produced is relatively proportional to the area beneath the solid line 9 of Fig. 1. As the top 11 is transparent to infrared radiation, the radiation not absorbed by the coating 14 will strike the coating 13 of lead sulfide and electrical energy relatively proportional to the area beneath the broken line 7 of Fig. 1 is produced. As the outputs from both coatings are fed into the indicating device the amount of combined electrical energy produced through the expedient of the two photoconductive coatings of different wave length sensitivity is proportioned to the area beneath the curve of Fig. 3 in which spectral sensitivity is also plotted on the ordinate against wave length on the abscissa. As is apparent, a similar result may be obtained by interchanging the positions of the two photoconductive coatings.

In the modification of Fig. 4, the base of dielectric material is shown at 19, the first photoconductive coating at 20, the dielectric spacer transparent to infrared radiation at 21, the second photoconductive coating of a different wave length sensitivity at 22 and the electrical leads for the two photoconductive coatings at 23 and 24. The operation of the cell in producing electrical energy is identical to that of the cell of Fig. 2.

Referring to the modification of Fig. 5, the numeral 25 indicates a base of dielectric material transparent to infrared radiation which may be of sapphire, magnesium oxide or calcium fluoride as in the previous modifications. A first photoconductive coating of one sensitivity is shown at 27, the spacer of transparent dielectric material at 28, and a second coating of photoconductive material of different wave length sensitivity at 29 with electrical leads for the two coatings shown at 31 and 32. The photoconductive coatings are of materials described hereinbefore and are applied in thicknesses and in the manner described above. In order to minimize the reflection of incident infrared radiation, a reflection reducing coating 30 is applied to the second photoconductive coating 29. This coating is fully described in the above referred to co-pending application. It has an index of refraction lower than that of the photoconductive material to which it is applied and is of an optical thickness which is an odd multiple of one-fourth the wave length of infrared radiation of principal interest. This material must be a dielectric, a solid at room temperature and susceptible of application as a coating by evaporation, sputtering, chemical deposition, spraying, or by other conventional means. It must also be transparent to infrared radiation. Materials suitable for the coatings are magnesium fluoride, silicon monoxide, lithium fluoride, antimony trisulfide, polystyrene and others. In order to increase the efficiency of the cell by maximum utilization of all energy which enters it, a reflecting coating 26 is applied to the bottom surface of the base 25. This coating is of conventional materials for this purpose, such as aluminum or silver and is applied by means conventional to these materials and in appropriate thickness. The operation of the device as respects the two photoconductive coatings of different wave length sensitivity range is identical to that previously described for other modifications. The addition of the reflection reduction coating 30 serves to reduce to a minimum the amount of incident radiation lost by reflection. As some radiation will pass through the three coatings, the spacer 28 and the base 25, the reflecting coating 26 serves to reflect unused radiation back through the photoconductive coatings with the result that maximum utilization of all energy entering the cell is made.

In Fig. 6, a simplified modification of the basic structure incorporating two photoconductive coatings of different wavelength sensitivity is shown. In the figure, the base of dielectric material transparent to infrared radiation is shown at 36, coated on either side with photoconductive coatings 37 and 38 of different wavelength sensitivity, the coatings being provided with electrical leads 39 and 40. This cell has the advantage that either side may be used as the front of the cell to be exposed to incident radiation.

A highly practical modification of the invention is shown in Fig. 7, a double walled structure in which the outer wall is indicated at 44. For receiving incident infrared radiation, the end section of the cell is provided with a window 45 which is transparent to infrared radiation. The material of the window may be of magnesium oxide, calcium fluoride, sapphire or other suitable infrared transmitting material. For supporting the necessary coatings, a magnesium oxide bridge 46 is mounted on the top of the inner wall of the cell as shown. It may be secured in place by conventional means. The bridge is coated at its central portion adjacent the window 45 with photoconductive coatings 47 and 48 of different wave length sensitivities. A reflection reducing coating 49 is applied to the photoconductive coating 47 and a reflecting coating 50 is applied to the top surface of the bottom wall opposite the photoconductive coating 48. The photoconductive coatings are provided with leads 51 and 52 as shown for conducting electrical energy from the cell. The operation of the photoconductive cell elements for the production of electrical energy is identical with the operation described for the cell of Fig. 5. An advantage of this cell stems from the fact that magnesium oxide is a good thermal conductor, so that the cell can be kept cool by keeping the base portion of outer wall 44 beneath the magnesium oxide bridge in contact with Dry Ice or other cooling medium.

The above description taken together with the accompanying drawings illustrates that the invention provides a means for increasing the wave length sensitivity of photoconductive cells. In addition, the invention combines this latter feature with the added features of reflection reduction and internal reflection to provide a cell of highly increased efficiency.

While the invention has been illustrated by specific structures, it is by no means limited to these modifications as it can be applied to a varied number of structures. The flexibility of the invention is illustrated, for example, by the interchangeability of the photoconductive coatings, as well as by other features.

Obviously, many modifications and variations of the present invention are possible in the light of the above teachings. It is, therefore, to be understood that within the scope of the appended claims the invention may be practiced otherwise than as specifically described.

I claim:

1. In a photoconductive cell, in combination; a layer of dielectric material transparent to infrared radiation; a coating of photoconductive material sensitive to a first infrared wave length band on one side of said dielectric layer; and a coating of photoconductive material sensitive to a second infrared wave length band on the other side of said dielectric layer; said coatings being provided with means for conducting current therefrom.

2. A photoconductive cell, comprising: a layer of dielectric material transparent at least to relatively long wave length infrared radiation; a first coating of photoconductive material on one side of said dielectric layer sensitive only to relatively short infrared radiation; a second coating of photoconductive material on the other side of said dielectric layer sensitive to infrared radiation including said relatively long wave length radiation, said coatings being provided with means for conducting current therefrom; whereby said cell is operative over a comparatively wide wave length range of infrared radiation when it is positioned so that said first coating receives the incident radiation.

3. The photoconductive cell of claim 2 in which said first coating is lead sulfide and said second coating is a member of the class consisting of lead telluride and lead selenide.

4. The photoconductive cell of claim 3 in which said second coating is lead telluride.

5. The photoconductive cell of claim 3 in which said first coating is lead selenide.

6. A photoconductive cell comprising: a layer of dielectric material transparent at least to relatively short wave length infrared radiation; a first coating of photoconductive material on one side of said dielectric layer sensitive only to relatively long wave length infrared radiation; a second coating of photoconductive material on the other side of said dielectric layer sensitive to infrared radiation including said relatively short wave length radiation, said coatings being provided with means for conducting current therefrom; whereby said cell is operative over a comparatively wide wave length range of infrared radiation when it is positioned so that said first coating receives the incident radiation.

7. The photoconductive cell of claim 6 in which said first coating is from the class consisting of lead selenide and lead teluride and said second coating is lead sulfide.

8. The photoconductive cell of claim 7 in which said first coating is lead selenide.

9. The photoconductive cell of claim 7 in which said first coating is lead teluride.

10. A photoconductive cell, comprising in combination: a base of dielectric material; a layer of dielectric material transparent to infrared radiation; a first coating of photoconductive material on one side of said dielectric layer sensitive to a first infrared wave length band; a second coating of photoconductive material on the other side of said dielectric layer sensitive to a second infrared wave length band, said coatings having means for conducting electrical current therefrom, said first coating being in contact with the top surface of said base.

11. A photoconductive cell comprising a base transparent to infrared radiation; a reflecting surface on one side of said base adapted to reflect infrared radiation through said base; a first photoconductive coating on the opposite side of said base sensitive to a first wave length band of infrared radiation and having means for conducting current therefrom; a layer of dielectric material transparent to infrared radiation and having one surface in contact with said first photoconductive coating; and a second coating of photoconductive material on the other surface of said dielectric layer for receiving incident infrared radiation and sensitive to a second wave length band of infrared radiation, said second coating having means for conducting current therefrom.

12. A photoconductive cell comprising a base transparent to infrared radiation; a reflecting surface on one side of said base adapted to reflect radiation through said base; a first photoconductive coating on the opposite side of said base sensitive to a first wave length band of relatively short wave length infrared radiation and having means for conducting current therefrom; a layer of dielectric material transparent to infrared radiation and having one surface in contact with said first photoconductive coating and a second coating of photoconductive material on the other surface of said dielectric layer for receiving incident infrared radiation and sensitive to a second infrared wave length band including relatively long wave length radiation, said second coating having means for conducting current therefrom.

13. The photoconductive cell of claim 12 in which said first coating is lead sulfide and said second coating is a material from the class consisting of lead selenide and lead teluride.

14. The photoconductive cell of claim 13 in which said second coating is lead selenide.

15. The photoconductive cell of claim 13 in which said second coating is lead teluride.

16. A photoconductive cell comprising a base transparent to infrared radiation; a reflecting surface on one side of said base adapted to reflect infrared radiation through said base; a first photoconductive coating on the opposite side of said base sensitive to a first wave length band of infrared radiation of relatively long wave lengths and having means for conducting current therefrom; a layer of dielectric material transparent to infrared radiation and having one surface contacting said first photoconductive coating; and a second coating of photoconductive material on the other surface of said dielectric layer for receiving incident infrared radiation and sensitive to a second wave length band of infrared radiation of relatively short radiation, said second coating having means for conducting current therefrom.

17. The photoconductive cell of claim 16 in which said second coating is lead sulfide and said first coating is a material selected from the class consisting of lead selenide and lead teluride.

18. The photoconductive cell of claim 17 in which said first coating is lead selenide.

19. The photoconductive cell of claim 17 in which said first coating is lead teluride.

20. In a photoconductive cell, in combination; a layer of dielectric material transparent to infrared radiation; a first coating of a photoconductive material sensitive to a first infrared wave length band on one surface of said dielectric layer; a second coating of photoconductive material on the other surface of said dielectric layer for receiving incident infrared radiation and sensitive to a second infrared wave length band, said coatings being provided with means for conducting current therefrom; and a layer of reflection reducing coating on the radiation receiving side of said second coating.

21. A photoconductive cell comprising a base transparent to infrared radiation; a reflecting surface on one side of said base adapted to reflect infrared radiation through said base; a first photoconductive coating on the opposite side of said base sensitive to a first wave length band of relatively short infrared radiation and having means for conducting a current therefrom; a layer of dielectric material transparent to infrared radiation and having one surface in contact with said first photoconductive coating; a second coating of photoconductive material on the other surface of said dielectric layer for receiving incident infrared radiation and sensitive to a second wave length band including relatively long infrared radiation, said second coating having means for conducting current therefrom; and a reflection reducing coating transparent to infrared radiation on the radiation receiving side of said second coating.

22. The photoconductive cell of claim 21 in which said first coating is lead sulfide and said second coating is a material from the class consisting of lead selenide and lead teluride.

23. The photoconductive cell of claim 22 in which said second coating is lead selenide.

24. The photoconductive cell of claim 21 in which said second coating is lead teluride.

25. A photoconductive cell comprising a base transparent to infrared radiation; a reflecting surface on one side of said base adapted to reflect infrared radiation through said base; a first photoconductive coating on the opposite side of said base sensitive to a first wave length band of infrared radiation of relatively long wave lengths and having means for conducting current therefrom; a layer of dielectric material transparent to infrared radiation and having one surface in contact with said first photoconductive coating; a second coating of photoconductive material on the other side of said dielectric layer for receiving incident infrared radiation and sensitive to a second wave length band of infrared radiation of relatively short wave length radiation, said second coating having means for conducting current therefrom; and a reflection reducing coating transparent to infrared radiation on the radiation receiving side of said second coating.

26. The photoconductive coating of claim 25 in which said second coating is lead sulfide and said first coating is a material selected from the class consisting of lead selenide and lead teluride.

27. The photoconductive coating of claim 26 in which said first coating is lead selenide.

28. The photoconductive coating of claim 26 in which said first coating is lead teluride.

29. A photoconductive cell comprising a base of dielectric material; supporting sides of dielectric material; a top transparent to infrared radiation; a first photoconductive coating on the inner side of said base reactive to infrared radiation of a first wave length band and having means for conducting current therefrom; a second photoconductive coating on the outer side of said top reactive to infrared radiation of a second wave length band and having means for conducting current therefrom.

30. The device of claim 29 in which said base is provided with a mirror surface on its underside adapted to reflect radiation through the base, and a reflection reducing coating is provided on the top of each of said photoconductive coatings.

31. A low temperature photoconductive cell comprising a double walled container having an end section; a window located centrally in the outer wall of said end section transparent to infrared radiation; a magnesium oxide bridge mounted on the inner wall of said end section opposite said window; a reflecting coating on the inner surface of the lower wall of said end section centrally thereof and adapted to reflect infrared radiation; a first photoconductive coating on the under surface of said bridge opposite said reflecting surface having means for conducting current therefrom and sensitive to a first wave length band of infrared radiation; a second photoconductive coating on the upper surface of said bridge opposite said first coating and having means for conducting current therefrom and sensitive to a second wave length band; and a reflection reducing coating on said second coating.

32. The photoconductive cell of claim 31 in which that section of the cell in contact with the magnesium oxide bridge is in contact with a cooling medium.

References Cited in the file of this patent

UNITED STATES PATENTS 2,544,261   Gibson _____ Mar. 6, 1951